United States Patent
Uemura et al.

(10) Patent No.: US 9,137,448 B2
(45) Date of Patent: Sep. 15, 2015

(54) MULTI-RECORDING IMAGE CAPTURING APPARATUS AND CONTROL METHOD FOR MULTI-RECORDING IMAGE CAPTURING APPARATUS FOR ENABLING THE CAPTURE OF TWO IMAGE AREAS HAVING TWO DIFFERENT ANGLES OF VIEW

(71) Applicant: Olympus Imaging Corp., Shibuya-ku, Tokyo (JP)

(72) Inventors: Tatsuyuki Uemura, Tachikawa (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/097,653

(22) Filed: Dec. 5, 2013

(65) Prior Publication Data
US 2014/0168476 A1    Jun. 19, 2014

(30) Foreign Application Priority Data

Dec. 5, 2012   (JP) .................................. 2012-266349

(51) Int. Cl.
*H04N 5/262* (2006.01)
*H04N 5/232* (2006.01)

(52) U.S. Cl.
CPC ....... *H04N 5/23296* (2013.01); *H04N 5/23216* (2013.01); *H04N 5/23245* (2013.01); *H04N 5/23293* (2013.01)

(58) Field of Classification Search
CPC .................................................. H04N 5/23296
USPC ........................................................ 348/240.1
See application file for complete search history.

(56) References Cited

U.S. PATENT DOCUMENTS

| | | | | |
|---|---|---|---|---|
| 5,172,234 | A * | 12/1992 | Arita et al. ................. | 348/240.2 |
| 2009/0009652 | A1 * | 1/2009 | Sudo et al. .................... | 348/349 |
| 2009/0185064 | A1 * | 7/2009 | Maniwa ................... | 348/333.11 |
| 2011/0115947 | A1 * | 5/2011 | Oh ........................... | 348/240.99 |
| 2012/0105647 | A1 * | 5/2012 | Yoshizumi ................... | 348/169 |

FOREIGN PATENT DOCUMENTS

| | | |
|---|---|---|
| JP | 2010-147925 | 7/2010 |
| JP | 2010-268019 | 11/2010 |
| JP | 2012-095083 | 5/2012 |

OTHER PUBLICATIONS

Office Action from corresponding Japanese Patent Application No. 2012-266349, mailed Jul. 8, 2014 (2 pgs.), with translation (3 pgs.).

\* cited by examiner

*Primary Examiner* — Gary C Vieaux
(74) *Attorney, Agent, or Firm* — John C. Pokotylo; Straub & Pokotylo

(57) ABSTRACT

An imaging apparatus includes: an optical system configured to form an image of an object; an imaging unit configured to image an image of the object and generate image data; a first image generating unit configured to generate a first image data based on image data from a first area of the image data; a second image generating unit configured to generate a second image data based on image data from a second area of the image data; and a controller which (A) detects a setting operation and then sets the first area in the second area, and (B) detects a zooming operation and then performs zooming of the optical system, wherein a zooming range of the optical system is limited based on a setting of the second area.

6 Claims, 11 Drawing Sheets

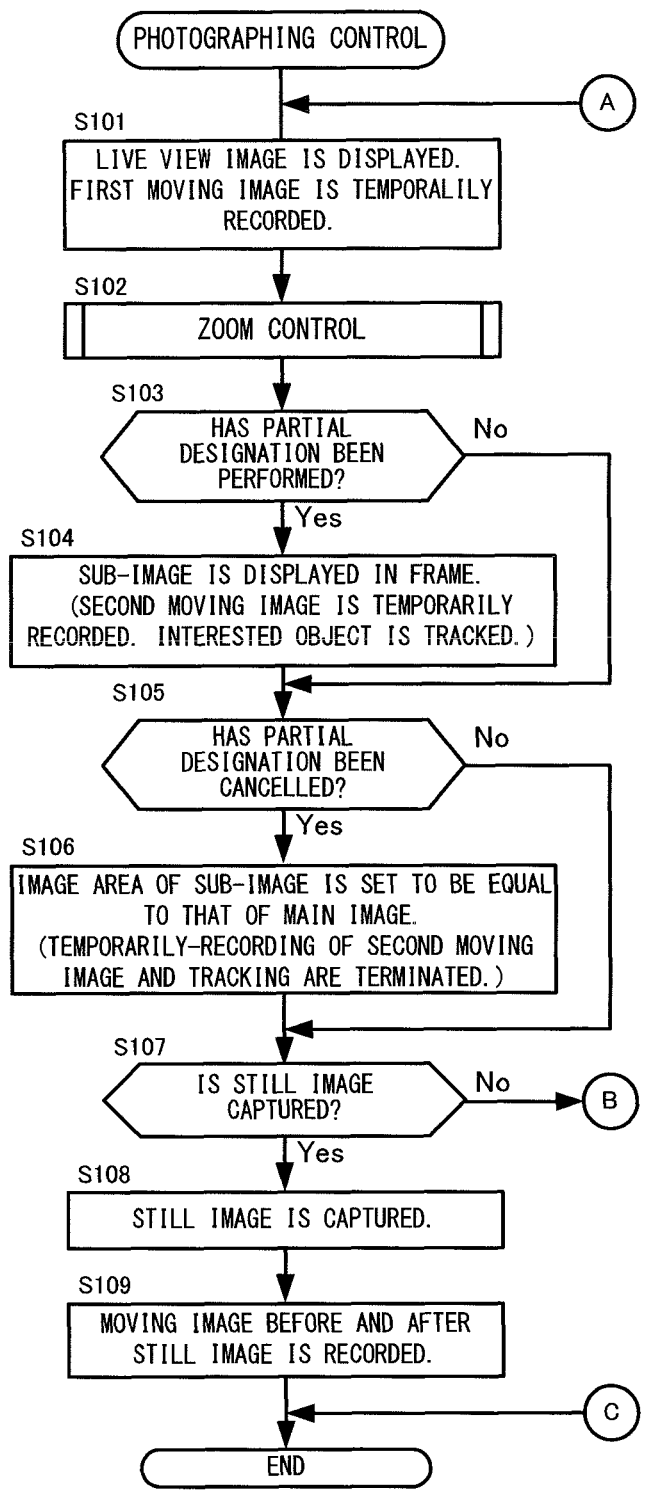

MULTI-RECORDING IMAGE CAPTURING APPARATUS AND CONTROL METHOD FOR MULTI-RECORDING IMAGE CAPTURING APPARATUS FOR ENABLING THE CAPTURE OF TWO IMAGE AREAS HAVING TWO DIFFERENT ANGLES OF VIEW

CROSS-REFERENCE TO RELATED APPLICATIONS

This application is based upon and claims the benefit of priority from prior Japanese Patent Application No. 2012-266349, filed Dec. 5, 2012, the entire contents of which are incorporated herein by reference.

BACKGROUND OF THE INVENTION

1. Field of the Invention

The present invention relates to an image capturing apparatus for generating a plurality of pieces of image data from a single image, and to a control method for the image capturing apparatus.

2. Description of the Related Art

It is demanded to simultaneously capture an image of a wide range which grasps a whole atmosphere and an enlarged image representing a specific object in the image. Therefore a technology relating to an image capturing apparatus which simultaneously captures a plurality of images of different angles is known. For example, the Japanese Unexamined Patent Application Publication No. 2010-268019 discloses a technology by which an image which grasps a wide range and an enlarged image are synthesized together to record the two images as a synthesized image. There are image capturing apparatuses (digital camera) which can simultaneously capture two images from different angles, for example, Olympus SZ-30MR. (http://www.getolympus.com/us/en/digitalcameras/sz-30mr.html) The SZ-30MR has a technology called multi-recording function, by which two images from different angles of view can simultaneously be captured.

A user uses a zoom function of the image capturing apparatus to change a photographing range or an angle of view in accordance with a condition of an object. The zoom function of the above-described digital camera is also useful for the user. The user needs to consider two images of different angles when using the zoom function of the digital camera. It is troublesome for the user to use the zoom function while considering the two images. A digital camera which removes the trouble is demanded.

SUMMARY OF THE INVENTION

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 5A and 5B are flowcharts showing an example of photographing control of the digital camera according to the aspect of the embodiment.

DESCRIPTION OF THE PREFERRED EMBODIMENTS (First Embodiment)

Figure 1:
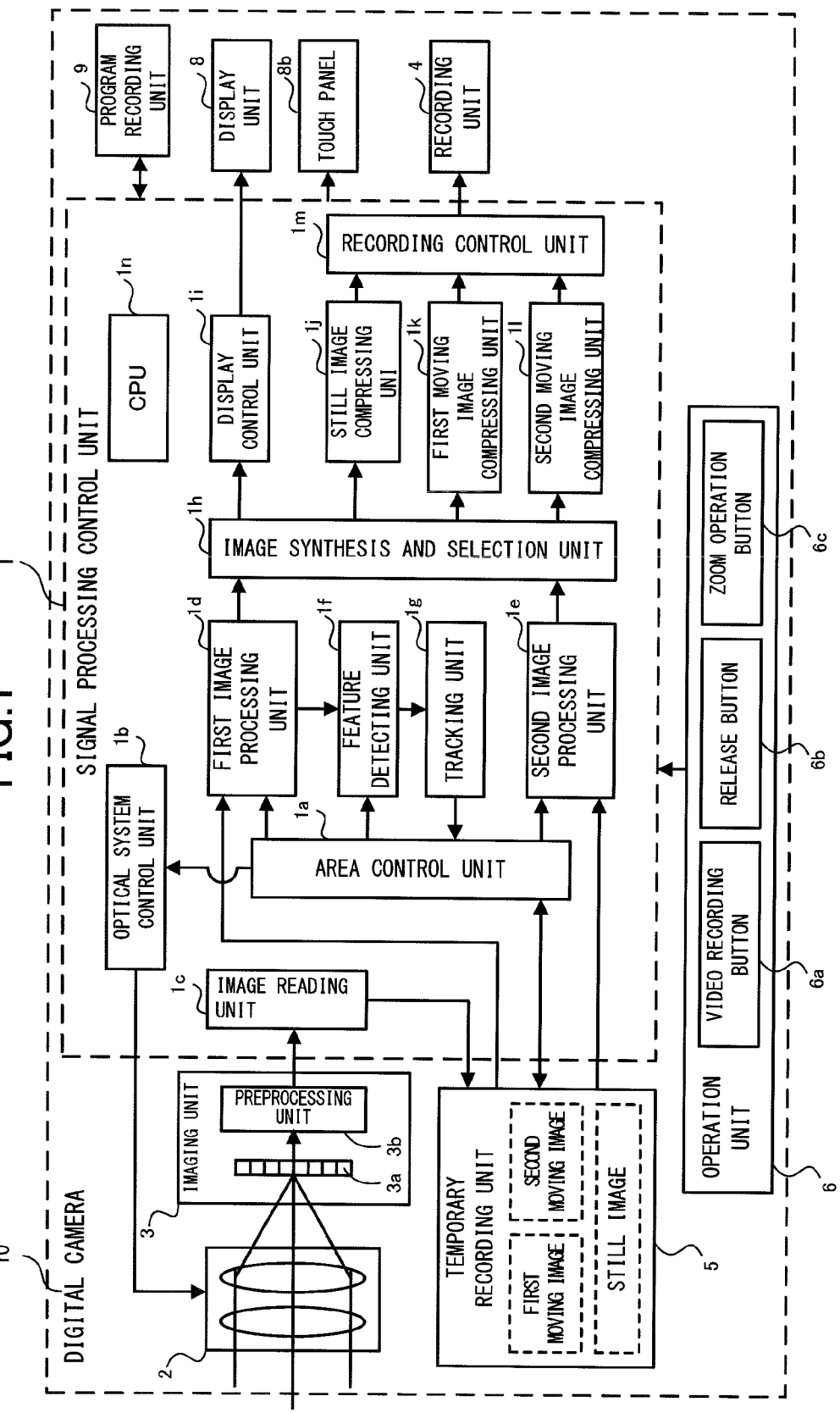
FIG. 1 is a block dialog showing a configuration of a digital camera according to an aspect of an embodiment of a present invention.

A first embodiment according to the present invention will be described with reference to the drawings. A configuration example of a digital camera (image capturing apparatus) 10 according to the embodiment is schematically shown in FIG. 1. The digital camera 10 is capable of performing multi-recording which allows to simultaneously obtain two types of images including a main image which includes an image of a wide range and a sub-image which includes an image of a narrower range than the main image. The digital camera 10 has a signal processing control unit 1, an optical system 2, an imaging unit 3, a recording unit 4, a temporary recording unit 5, an operation unit 6, a display unit 8, a touch panel 8b, and a program recording unit 9. The signal processing control unit 1 controls each unit of the digital camera 10 and performs various signal processes (described later).

The optical system 2 comprises a lens, a stop, and the like, and forms an object image on an image pickup device 3a of the imaging unit 3. In the embodiment, the optical system 2 has a zoom mechanism. The imaging unit 3 includes the image pickup device 3a and a preprocessing unit 3b. The image pickup device 3a receives light of the object image formed by the optical system 2, and performs photoelectric conversion to output an electric signal. The preprocessing unit 3b is, for example, an ASIC (application specific integrated circuit). The preprocessing unit 3b obtains the electric signal output from the image pickup device 3a. The preprocessing unit 3b performs processing such as CDS (correlated double sampling), AGC (automatic gain control), and ADC (analog-digital conversion) for the electric signal, and outputs an image signal.

Image data processed and compressed by the signal processing control unit 1 is recorded in the recording unit 4. The image data recorded in the recording unit 4 includes a still image and video. The recording unit 4 comprises a common recording medium detachably connected to the digital camera 10, for example. An image signal obtained by the imaging unit 3 is temporarily recorded in the temporary recording unit 5 under control of the signal processing control unit 1. The temporary recording unit 5 is capable of recording a first moving image relating to the main image, a second moving image relating to the sub-image, and a still image relating to at least one of the main image or the sub-image.

The operation unit 6 detects user's various operations of the digital camera and outputs a signal to the signal processing control unit 1 in response to a user's operation. The operation unit 6 includes a video recording button 6a for instructing to start and end shooting video, a release button 6b for instructing capturing a still image, and a zoom operating button 6c for instructing zoom-in and zoom-out.

The display unit 8 comprises a display device such as a liquid crystal display and an organic light emitting display. The display unit 8 displays various images under control of the signal processing control unit 1. For example, a through image (also called a live view image) obtained by synthesizing the main image and the sub-image, and a captured still image are displayed on the display unit 8. The touch panel 8b provided over the display unit 8 detects user's touch input and outputs a detected result to the signal processing control unit 1.

The signal processing control unit 1 includes an area control unit 1a, an optical system control unit 1b, an image reading unit 1c, a first image processing unit 1d, a second image processing unit 1e, a feature detecting unit 1f, a tracking unit 1g, an image synthesis and selection unit 1h, a display control unit 1i, a still image compressing unit 1j, a first moving image compressing unit 1k, a second moving image compressing unit 1l, a recording control unit 1m, and a CPU 1n. The CPU 1n controls functional units which constitute the signal processing control unit 1 based on a program stored in the program recording unit 9. The program recording unit 9 is a recording medium where a program or an instruction to be executed by the CPU 1n is recorded.

The area control unit 1a determines an area of the main image (a first area) and an area of the sub-image (a second area) from an image generated by the imaging unit. Information input through the zoom operation button 6c or the touch panel 8 and object position information input through the tracking unit 1g (described later) are used in order to determine the areas of the main image and the sub-image. The optical system control unit 1b controls a zoom mechanism of the optical system 2 based on the information relating to the areas of the main image and the sub-image determined by the area control unit 1a. The image reading unit 1c reads an image output from the imaging unit 3 and then temporarily records the image in the temporary recording unit 5.

The first image processing unit 1d obtains the first Moving image and/or the still image from the temporary recording unit 5 and then performs image processing to generate a moving image and/or a still image relating to the main image based on the information relating to the area of the main image determined by the area control unit 1a. The image processing includes contrast correction and color correction. The first image processing unit 1d outputs the processed image data to the image synthesis and selection unit 1h. The second image processing unit 1e obtains the second moving image and/or the still image from the temporary recording unit 5 and then performs image processing to generate a moving image and/or a still image relating to the sub-image based on the information relating to the area of the sub-image determined by the area control unit 1a. The image processing includes contrast correction and color correction. The second image processing unit 1e outputs the image data after the processing to the image synthesis and selection unit 1h.

The feature detecting unit 1f obtains information relating to the area designated as the sub-image by the area control unit 1a and then detects a feature of the image in the sub-image from the first moving image. The feature detecting unit 1f detects a person's face. The tracking unit 1g tracks the object (person's face) based on the feature detected by the feature detecting unit 1f. The tracking unit 1g outputs a result of tracking to the area control unit 1a.

The image synthesis and selection unit 1h determines an image to be displayed on the display unit 8 and an image to be recorded in the recording unit 4 and then performs image synthesis and image selection. The image synthesis and selection unit 1h uses the moving image and the still image relating to the main image image-processed by the first image processing unit 1d and the moving image and the still image relating to the sub-image image-processed by the second image processing unit 1e in accordance with input through the operation unit 6 or the touch panel 8b. The image to be displayed on the display unit 8 and the image to be recorded in the recording unit 4 may be appropriately selected from the first moving image and the second moving image and still image and synthesized.

The display control unit 1i displays the image determined by the image synthesis and selection unit 1h to be displayed on the display unit 8. The still image compressing unit 1j compresses the still image based on determination of the image synthesis and selection unit 1h. The first moving image compressing unit 1k compresses the moving image relating to the main image based on determination of the image synthesis and selection unit 1h. The second moving image compressing unit 1l compresses the moving image relating to the sub-image based on determination of the image synthesis and selection unit 1h. The recording control unit 1m records the image data compressed by the still image compressing unit 1j, the first moving image compressing unit 1k, and the second moving image compressing unit 1l in the recording unit 4. Here an example in which the still image data is compressed to be recorded in the recording unit 4 is shown. However, the still image data may be recorded in a RAW format or lossy compression.

Figure 2:
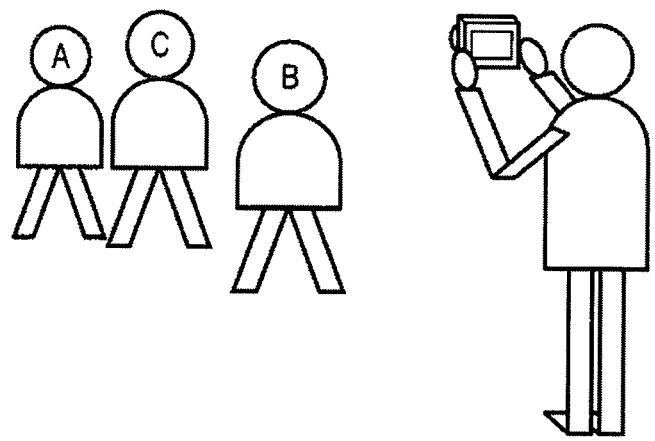
FIG. 2 is dialog showing a case in which the digital camera according to the aspect of the embodiment is used.

The digital camera 10 is successfully used in a photographing situation shown in FIG. 2, for example. In the photographing situation shown in FIG. 2, there is a plurality of people to be photographed as an object. In the photographing situation, a photographer (user) may want to simultaneously take a whole image which includes the people and an enlarged image of a part of the image. Such a photographing scene is not limited to a situation where people are photographed as an object. The digital camera 10 according to the embodiment is applied to a situation where the image of a wider range and the enlarged image of a part of the image are simultaneously obtained. The digital camera 10 according to the embodiment is capable of simultaneously obtaining a plurality of images of different angles of view. As described above, a mode in which a plurality of images is simultaneously obtained is referred to as a multi-recording mode in the embodiment.

Figure 3:
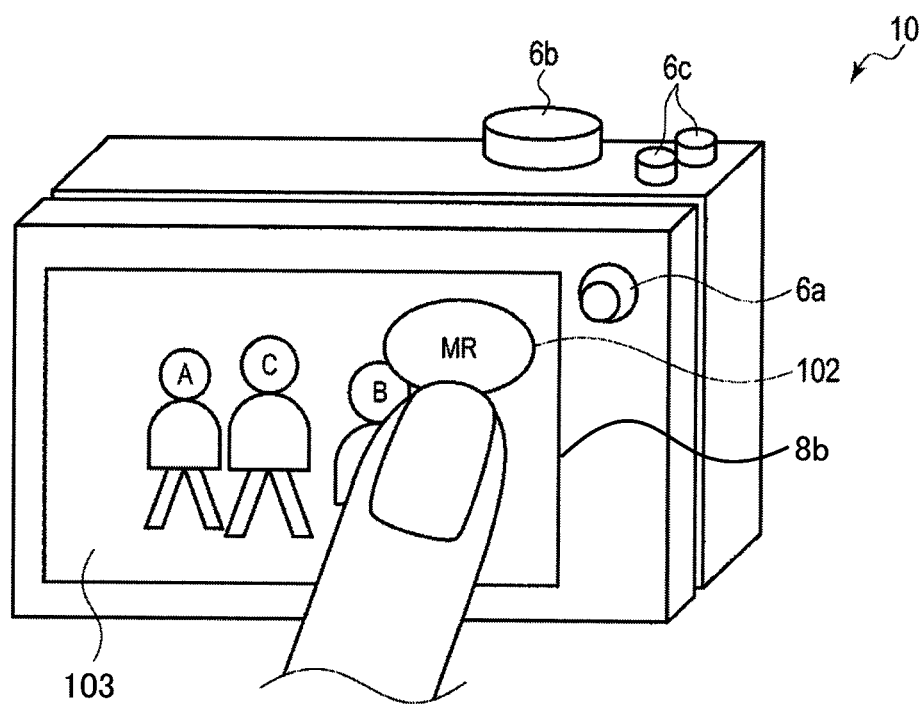
FIG. 3 is a flowchart showing an operation outline of the digital camera according to the aspect of the embodiment.
Figure 4:
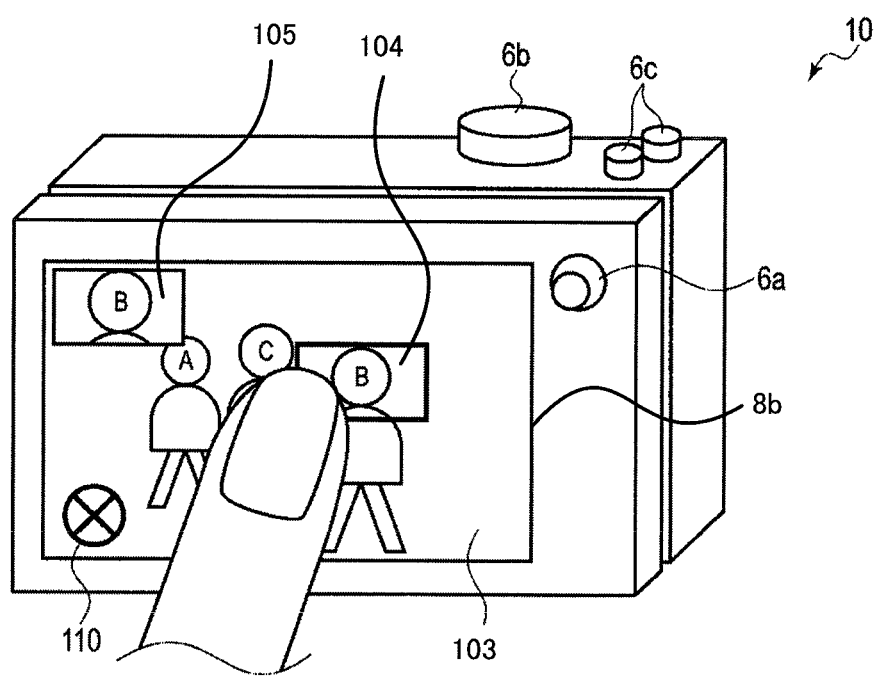
FIG. 4 is a flowchart showing an operation outline of the digital camera according to the aspect of the embodiment.

As shown in FIG. 3, for example, an icon of an MR button 102 representing multi-recording is displayed on the display unit 8 in the multi-recording mode. When the user touches the icon, the touch panel 8b detects that the MR button 102 has been touched. Subsequently, as shown in FIG. 4, the user touches an interested person B, for example. An area to be cut out from the main image is set based on the touched position. A specified size of the area to be cut out is set so that a face of the person B can be included. The digital camera 10 simultaneously obtains the main image and the image of the designated area, and then a live view image obtained by synthesizing the two images is displayed in the display unit 8. In FIG. 4, a frame of 104 is an area to be cut out and a frame of 105 is an image obtained from the area of 104.

An image which includes a whole (103 of FIG. 4) and a selected image such as the person B (104 of FIG. 4) are referred to as a main image and a sub-image, respectively in the multi-recording. A situation where the sub-image is designated is referred to as to be partially-designated. During the multi-recording, a cancel button 110 is displayed at a bottom left of the display unit 8, as shown in FIG. 4. When the cancel button 110 is touched, acquisition of the sub-image is terminated. In the multi-recording, two images of the main image and the sub-image are obtained.

As shown in FIGS. 3 and 4, the video recording button 6a for instructing to start and end shooting a video, the release button 6b for instructing to start and end capturing a still image, and the zoom operating button 6c for instructing zoom-in and zoom-out are provided in the digital camera 10 according to the embodiment.

Figure 5B:
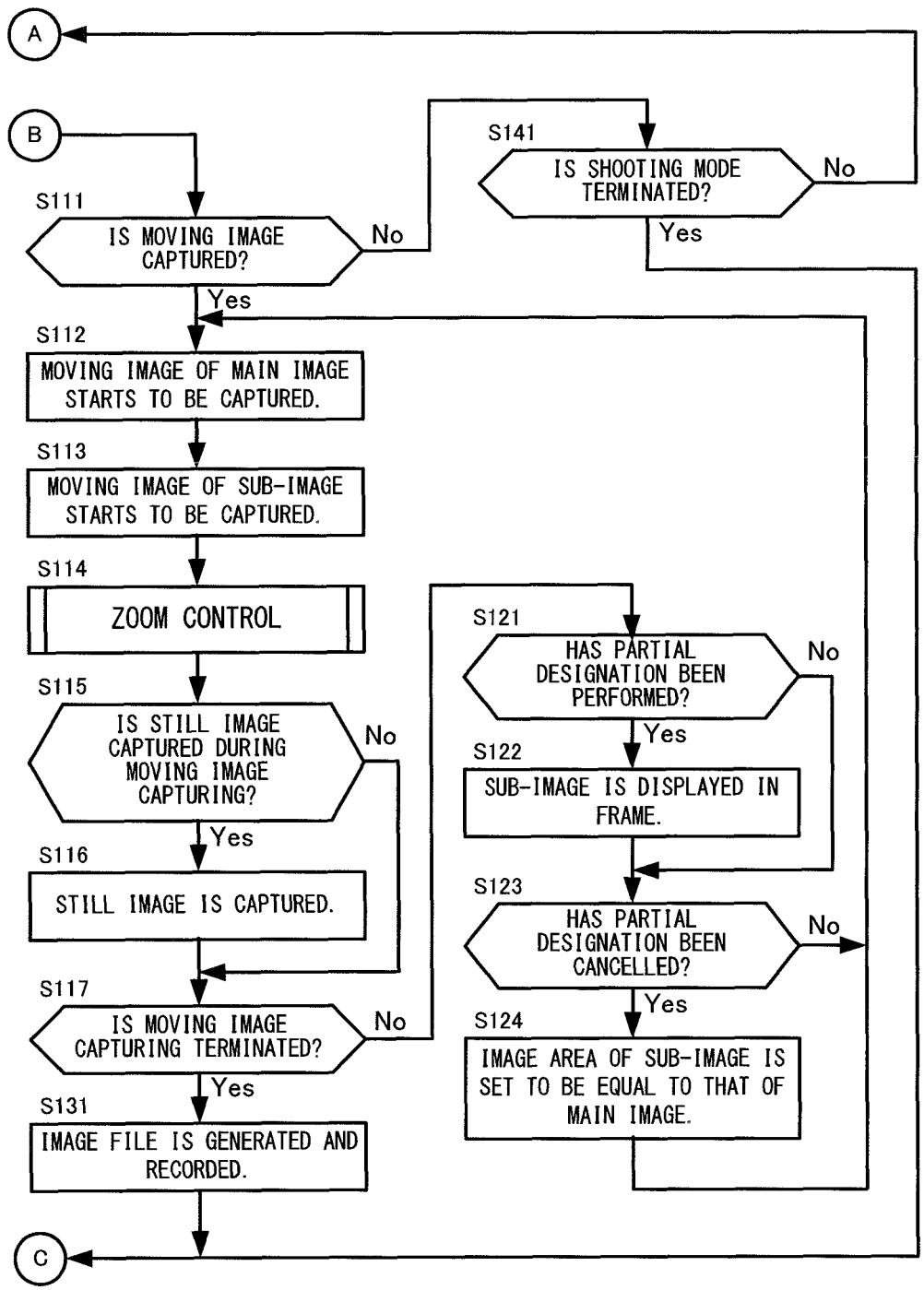

Shooting operation of the digital camera 10 according to the embodiment will be described with reference to a flowchart shown in FIG. 5. According to the embodiment, the first moving image which is mainly used as the main image and the second moving image which is mainly used as the sub-image are handled. The first image and the second image are always obtained on account of ease of controlling.

At step 5102, the signal processing control unit 1 performs zoom control. The zoom control will be described with reference to a flowchart shown in FIGS. 6A and 6B. At step 5201, the signal processing control unit 1 determines whether or not zoom operation has been performed. For example, the zoom operation is performed if a zoom operation button 6c of the digital camera 10 shown in FIG. 3 is pressed. Alternatively, the zoom operation may be performed by changing a distance between two points touched on the touch panel 8b, that is, by pinch-in and pinch-out. The zoom control is terminated when the zoom operation has not performed and then the process returns to shooting control (FIG. 5A). When it is determined that the zoom operation has been performed, the process proceeds to step 5202.

At step S102, the signal processing control unit 1 performs zoom control. The zoom control will be described with reference to a flowchart shown in FIG. 6. At step S201, the signal processing control unit 1 determines whether or not zoom operation has been performed. For example, the zoom operation is performed if a zoom operation button 6c of the digital camera 10 shown in FIG. 3 is pressed. Alternatively, the zoom operation may be performed by changing a distance between two points touched on the touch panel 8b, that is, by pinch-in and pinch-out. The zoom control is terminated when the zoom operation has not performed and then the process returns to shooting control (FIG. 5). When it is determined that the zoom operation has been performed, the process proceeds to step S202.

At step S202, the signal processing control unit 1 determines whether or not partial designation has been performed relating to the multi-recording, in other words, whether or not the sub-image has been designated. When it is determined that there is partial designation, the process proceeds to step S203. At step S203, the signal processing control unit 1 determines whether or not a zooming direction is a magnification direction, in other words, whether or not zoom-in is performed. When the zoom-in is performed, the process proceeds to step S204. At step S204, the signal processing control unit 1 performs MR zoom-in.

Figure 7:
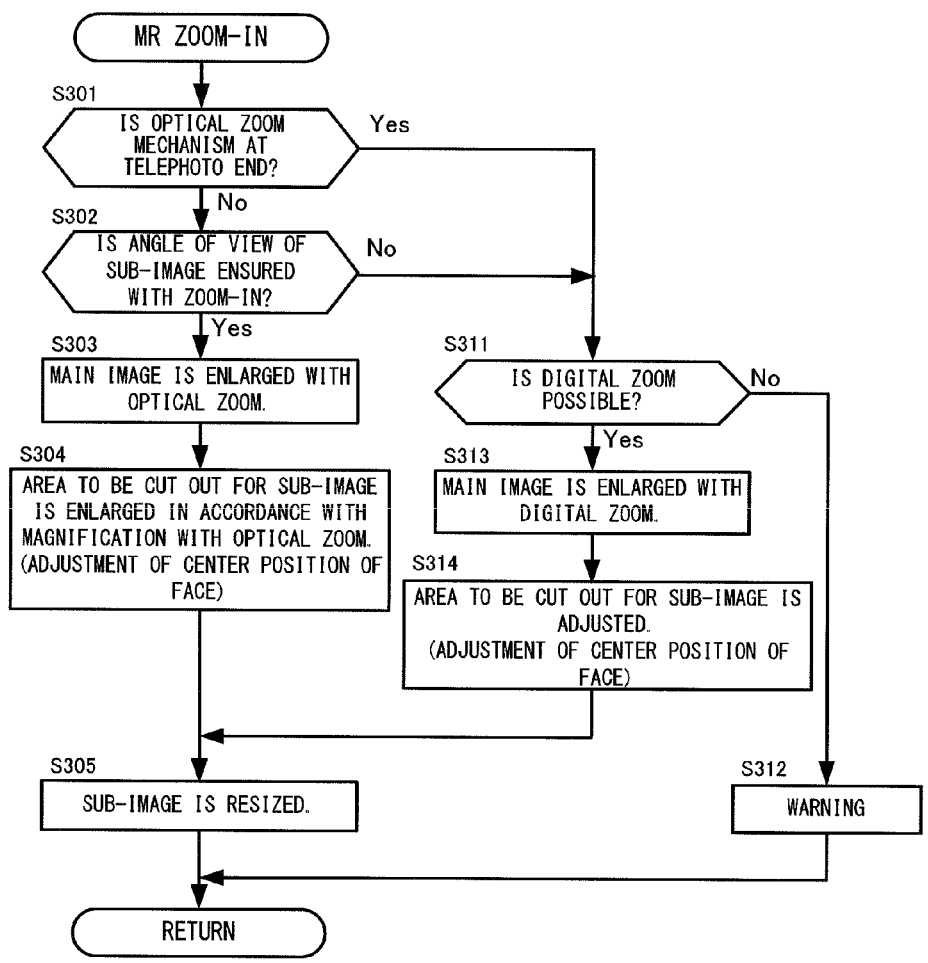
FIG. 7 is a flowchart showing an example of MR zoom-in of the digital camera according to the aspect of the embodiment.

The MR zoom-in will be described with reference to a flowchart shown in FIG. 7. At step S301, the signal processing control unit 1 determines whether or not a zoom mechanism of the optical system 2 is at a telephoto end. When it is determined that the zoom mechanism is at the telephoto end, the process proceeds to step S311. On the other hand, when it is determined that the zoom mechanism is not at the telephoto end, the process proceeds to step S302.

Figure 8A:
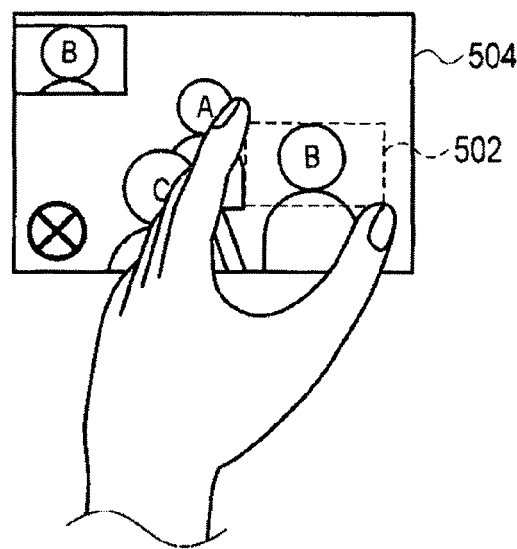
FIGS. 8A, 8B, 8C, and 8D are diagrams describing an operation of the digital camera according to the aspect of the embodiment.

At step S302, the signal processing control unit 1 determines whether or not the angle of view of the sub-image is ensured even if next zoom-in is performed by optical zoom. Here whether or not the angle of view of the sub-image is ensured will be described with reference to FIG. 8. For example, when the object is touched as shown in FIG. 4, an appropriate area which includes the object is selected by the area control unit 1a and a feature detecting unit 1f in conjunction with each other. Alternatively, the area of the sub-image may be designated by user's two fingers as shown in FIG. 8A, in other words, the operation may be performed by so-called pinch-in and pinch-out. The area is obtained from the sub-image, determined in this manner, and is referred to as a sub-image area 502. Meanwhile, the area of the main image is referred to as a main image area 504.

Figure 8B:
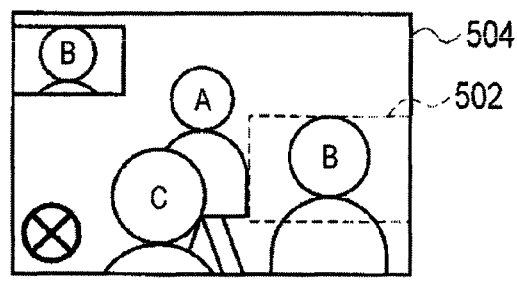
Figure 8C:
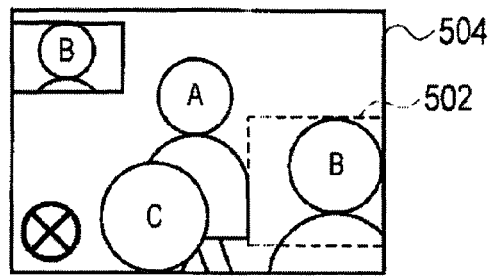

As shown in FIG. 8A, a case where a center of the sub-image area 502 is not that of the main image area 504 will be considered. If the zoom-in is performed toward the main image under the situation of FIG. 8A, the sub-image area 502 is included in the main image area 504 and so the sub-image is generated by cutting out the main image partially. However, when further zooming-in is made than FIG. 8B, the sub-image area 502 is not included in the main image area 504 as shown in FIG. 8C. When the sub-image area 502 is not included in the main image area 504 as shown in FIG. 8C, it is determined at step S302 that the angle of view of the sub-image is not ensured.

Figure 8D:
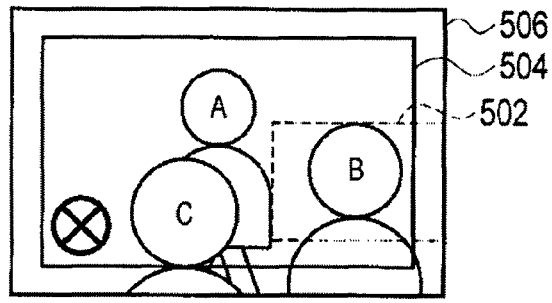

When the angle of view of the sub-image is not ensured, the main image and the sub-image are generated as follows. The zoom-in is performed with the optical zoom as long as the sub-image area 502 is included in the main image area 504 as shown in FIG. 8B. On the other hand, the optical zoom is not performed when it is determined that the angle of view of the sub-image is not ensured. That is, the angle of view similar to that of FIG. 8B is obtained by the imaging unit 3. The area obtained by the imaging unit 3 as shown in FIG. 8D is referred to as a captured image area 506. When it is determined that the angle of view of the sub image is not ensured, the main image is obtained by performing digital zoom of the captured image area 506. In other words, the zoomed-in image is obtained by cutting out the main image area 504 from the captured image area 506. The sub image is also cut out from the captured image area 506. In other words, the sub image is obtained by cutting out the sub image area 502 from the captured image area 506. As just described, the optical zoom is limited and the situation where the angle of view of the sub-image is not ensured can be avoided, as shown in FIG. 8C.

Referring back to FIG. 7, the MR zoom-in will be further described. When it is determined at step S302 that the angle of view of the sub-image is not ensured, the process proceeds to step S311. On the other hand, when it is determined that the angle of view of the sub-image is ensured, the process proceeds to step S303. At step S303, the signal processing control unit 1 drives the optical system 2 to zoom in and enlarge the main image with optical zoom. At step S304, the signal processing control unit 1 enlarges an area to be cut out from the main image for the sub-image in accordance with magnification with optical zoom. For example, when the sub-image includes an image of a face, a center position of the face may be adjusted to that of the sub-image. That is, an image area of the sub-image is adjusted in a manner that the image area of the sub-image does not change even if the optical zoom is performed.

A process of step S304 will be described with reference to FIGS. 9A to 9D. Assume that an image shown in FIG. 9A has been obtained before the zoom-in. Here the image area of the main image is a frame 512 and that of the sub-image is a frame 514. At that time, the sub-image is as shown by FIG. 9C.

Figure 9A:
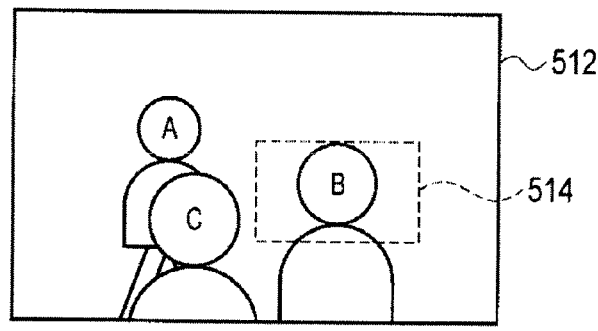
FIGS. 9A, 9B, 9C, and 9D are diagrams describing an operation of the digital camera according to the aspect of the embodiment.
Figure 9B:
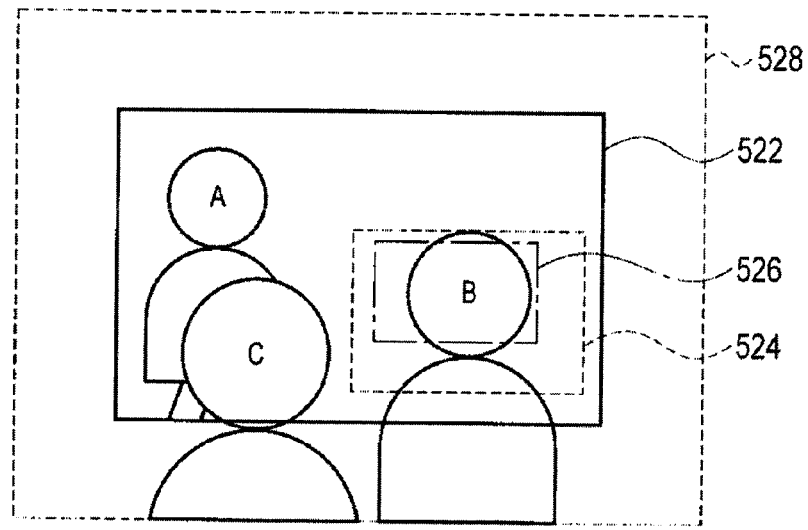

When the zoom-in is performed on the same object as FIG. 9A, the image area will be a frame 522. The image area of the sub-image will be a frame 526 if a proportion of the image area of the sub-image against the image area of the main image is not changed. As a result, the sub-image is as shown in FIG. 9D. It is not acceptable that the sub-image changes from as shown in FIG. 9C to FIG. 9D in accordance with the zoom-in relating to the main image.

Figure 9C:
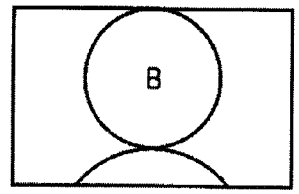
Figure 9D:
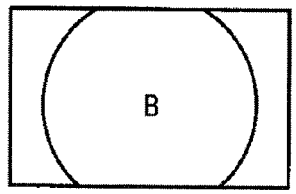

According the embodiment, the area to be cut out from the main image for the sub-image is adjusted in a manner that the sub-image does not change from FIG. 9C, for example, in accordance with the zoom-in relating to the main image. In other words, the area to be cut out is changed (adjusted) from the frame 526 to the frame 524 so that the proportion of the sub-image against the main image is increased as shown in FIG. 9B. A frame 528 is the image area before the zoom-in and a frame 522 is the image area after the zoom-in. According to the change (adjustment), the proportion of a size of the frame 514 against a size of the frame 512 before the zoom-in is same as the proportion of a size of the frame 524 against a size of a frame 528 after the zoom-in.

Adjustment is performed as described above and so the image area of the sub-image does not change even though the optical zoom is performed. In other words, the angle of view corresponding to the sub-image does not change even though the optical zoom is performed. As a result, the user can pay attention to the main image displayed on the display unit 8 to concentrate on the zoom-in relating to the main image. It is not necessary for the user to consider the sub-image.

At step S305, the signal processing control unit 1 Resizes the image cut out from the main image for the sub-image so that the image for the sub-image may be suitable for the sub-image. After that, the MR zoom-in is completed and then the process returns to the zoom control of FIG. 6A.

At step S311, the signal processing control unit 1 Determines whether or not the digital zoom is possible. When it is determined that the digital zoom is not possible, the process proceeds to step S312. At step S312, the signal processing control unit 1 displays a warning that the zoom-in is not possible on the display unit 8, for example. Not only by display but the warning may be sound. After that, the MR zoom-in is terminated and then the process returns to the zoom control of FIG. 6A.

When it is determined at step S311 that magnification is possible with the digital zoom, the process proceeds to step S313. At step S313, the signal processing control unit 1 enlarges the main image with the digital zoom. At step S314, the signal processing control unit 1 adjusts the area to be cut out for the sub-image. For example, when the sub-image includes an image of a face, a center position of the face may be adjusted to that of the sub-image. That is, the image area of the sub-image is adjusted in a manner that the image area of the sub-image does not change even if the optical zoom is performed. After that, the process proceeds to step S305.

Referring back to FIG. 6A, the zoom control will be further described. The MR zoom-in is performed at step S204, the zoom control is terminated, and then the process returns to the shooting control which is described with reference to FIG. 5A).

When it is determined at step S203 that the zooming Direction is not the magnification direction, the process proceeds to step S211. At step S211, the signal processing control unit 1 determines whether or not the digital zoom is being performed. In other words, when the angle of view of the sub-image is not ensured, the digital zoom is used and so it is determined at step S211 that the digital zoom is being performed. On the other hand, when the angle of view of the sub-image is ensured, the digital zoom is not used and so it is determined at step S211 that the digital zoom is not being performed. When it is determined at step S211 that the digital zoom is being performed, the process proceeds to step S212. At step S212, the signal processing control unit 1 widens the angle of view of the main image with the digital zoom. At step S213, the signal processing control unit 1 adjusts an area to be cut out for the sub-image. For example, when the sub-image includes an image of a face, a center position of the face may be adjusted to that of the sub-image. That is, an image area of the sub-image is adjusted in a manner that the image area of the sub-image does not change even if the digital zoom is performed. After that, the zoom control is terminated and then the process returns to the shooting control which is described with reference to FIGS. 5A and 5B).

When it is determined at step S211 that the digital zoom is not being performed, the process proceeds to step S214. At step S214, the signal processing control unit 1 determines whether or not the zoom mechanism of the optical system 2 is at a wide-angle end. When it is determined that the zoom mechanism of the optical system 2 is at the wide-angle end, the process proceeds to step S215. At step S215, the signal processing control unit 1 displays a warning on the display unit 8 that the angle of view cannot be widened any more by further zoom-out, for example. After that, the zoom control is terminated and then the process returns to the shooting control which is described with reference to FIGS. 5A and 5B.

When it is determined at step S214 that the zoom Mechanism of the optical system 2 is not at the wide-angle end, the process proceeds to step S216. At step S216, the signal processing control unit 1 moves the optical system 2 for zoom-out to widen the angle of view of the main image with the optical zoom. At step S217, the signal processing control unit 1 reduces the area to be cut out from the main image for the sub-image. For example, when the sub-image includes an image of a face, a center position of the face may be adjusted to that of the sub-image. That is, the image area of the sub-image is adjusted in a manner that the image area of the sub-image does not change even if optical zoom is performed. After that, the zoom control is terminated and then the process returns to the shooting control which is described with reference to FIGS. 5A and 5B.

When it is determined at step S202 that partial Designation has not been performed, the process proceeds to step S221. At step S221, the signal processing control unit 1 determines whether or not the zooming direction is the magnification direction, in other words, whether or not zoom-in is performed. When zoom-in is performed, the process proceeds to step S222. At step S222, the signal processing control unit 1 determines whether or not the mechanism of the optical system 2 is at the telephoto end. When it is determined that the mechanism of the optical system 2 is not at the telephoto end, the process proceeds to step S223. At step S223, the signal processing control unit 1 moves the optical system 2 for zoom-in to enlarge the image with the optical zoom. After that, zoom control is terminated and then the process returns to the shooting control which is described with reference to FIGS. 5A and 5B.

When it is determined at step S222 that the mechanism of the optical system 2 is at the telephoto end, the process proceeds to step S224. At step S224, the signal processing control unit 1 determines whether or not further zoom-in is possible with the digital zoom. When it is determined that the zoom-in is not possible with digital zoom, the process proceeds to step S225. At step S225, the signal processing control unit 1 displays a warning on the display unit 8 that the image cannot be enlarged anymore by further zooming-in, for example. After that, the zoom control is terminated and then the process returns to the shooting control which is described with reference to FIGS. 5A and 5B.

When it is determined at step S224 that further zoom-in is possible with the digital zoom, the process proceeds to step S226. At step S226, the signal processing control unit 1 enlarges the image with the digital zoom. After that, the zoom control is terminated and then the process returns to the shooting control which is described with reference to FIGS. 5A and 5B.

When it is determined at step S221 that the zooming Direction is not the magnification direction, the process proceeds to step S231. At step S231, the signal processing control unit 1 determines whether or not the digital zoom is being performed. When it is determined that the digital zoom is being performed, the process proceeds to step S232. At step S232, the signal processing control unit 1 widens the angle of view with the digital zoom. After that, the zoom control is terminated and then the process returns to the shooting control which is described with reference to FIGS. 5A and 5B.

When it is determined at step S231 that the digital zoom is not being performed, the process proceeds to step S233. At step S233, the signal processing control unit 1 determines whether or not the zoom mechanism of the optical system 2 is at the wide-angle end. When it is determined that the zoom mechanism of the optical system 2 is at the wide-angle end, the process proceeds to step S234. At step S234, the signal processing control unit 1 displays a warning on the display unit 8 that the angle of view cannot be widened any more by further zoom-out, for example. After that, the zoom control is terminated and then the process returns to the shooting control which is described with reference to FIGS. 5A and 5B.

When it is determined at step S233 that the zoom Mechanism of the optical system 2 is not at the wide-angle end, the process proceeds to step S235. At step S235, the signal processing control unit 1 moves the optical system for zoom-out to widen the angle of view of the main image with optical zoom. After that, the zoom control is terminated and then the process returns to shooting control which is described with reference to FIGS. 5A and 5B.

Referring back to FIG. 5A, the shooting control will be further described. After the zoom control, the process proceeds to step S103. At step S103, the signal processing control unit 1 determines whether or not partial designation has been performed. When it is determined that the partial designation has not been performed, the process proceeds to step S105. On the other hand, when it is determined that the partial designation has been performed, for example, when the touch panel 8b detects the MR button displayed on the display unit 8 has been touched, the process proceeds to step S104.

At step S104, the signal processing control unit 1 displays the sub-image in a frame displayed on the display unit 8. For example, as shown in FIG. 4, the sub-image is displayed at an upper left of the display unit 8 (105 of FIG. 4). Additionally, the signal processing control unit 1 temporarily records the second moving image used for the sub-image in the temporary recording unit 5. At that time, the signal processing control unit 1 tracks the interested object of the sub-image in the second moving image.

At step S105, the signal processing control unit 1 determines whether or not the partial designation has been cancelled. When it is determined that the partial designation has not been cancelled, the process proceeds to step S107. On the other hand, when it is determined that the partial designation has been cancelled, for example, when the touch panel 8b detects the cancel button displayed on the display unit 8 has been touched, the process proceeds to step S106.

At step S106, the signal processing control unit 1 sets the image area of the sub-image to be equal to that of the main image. According to the embodiment, the main image and the sub-image are always handled and so when the partial designation relating to the sub-image is cancelled, the image area of the sub-image is set to be equal to that of the main image. Additionally, the signal processing control unit 1 ends temporarily-recording the second moving image and tracking the interested object relating to the second moving image.

At step S107, the signal processing control unit 1 determines whether or not an instruction to start capturing the still image has been input. For example, when the release button 6b is pressed in order to input the instruction to start capturing the still image, the process proceeds to step S108. At step S108, the signal processing control unit 1 captures the still image. The signal processing control unit 1 records image data of the still image in the recording unit 4. At step S109, based on the first moving image or the second moving image recorded in the temporary recording unit 5, the signal processing control unit 1 associates the moving image before and after the still image with the still image to record the moving image in the recording unit 4.

Figure 10A:
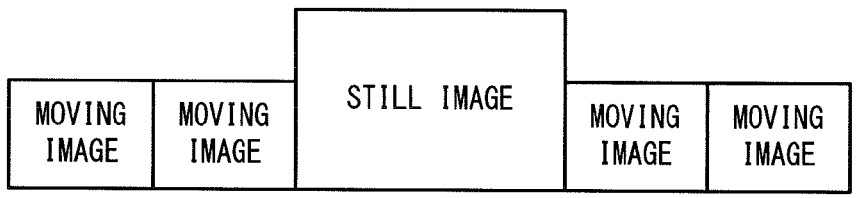
FIGS. 10A, 10B, and 10C are diagrams describing image data obtained by the digital camera according to the aspect of the embodiment.

FIG. 10A shows the data recorded at step S109. As shown in this figure, the moving images relating to before and after the still image are associated with the still image and recorded together. When the partial designation has been performed, the still image may be either the image of the main image or that of the sub-image. Further, either the first moving image relating to the main image or the second moving image relating to the sub-image may be used for the moving image regardless of whether the main image or the sub-image is used for the still image. In FIG. 10A, the still image is shown larger, which indicates that an image size of the still image is larger. Such an image data where the moving images are provided before and after the still image is referred to as a reminiscence photograph.

Referring back to FIG. 5A, the shooting control will be further described. When it is determined at step S107 that the instruction to start capturing the still image has not been input, the process proceeds to the step S111. At step S111, it is determined whether or not an instruction to start capturing the moving image has been input. For example, the video recording button 6a is pressed in order to input the instruction to start capturing the moving image, the process proceeds to step S112. At step S112, the signal processing control unit 1 starts capturing the moving image of the main image. In other words, the moving image of the main image starts to be recorded on the recording unit 4. At step S113, the signal processing control unit 1 starts capturing the moving image of the sub-image. In other words, the moving image of the sub-image starts to be recorded on the recording unit 4.

Figure 6A:
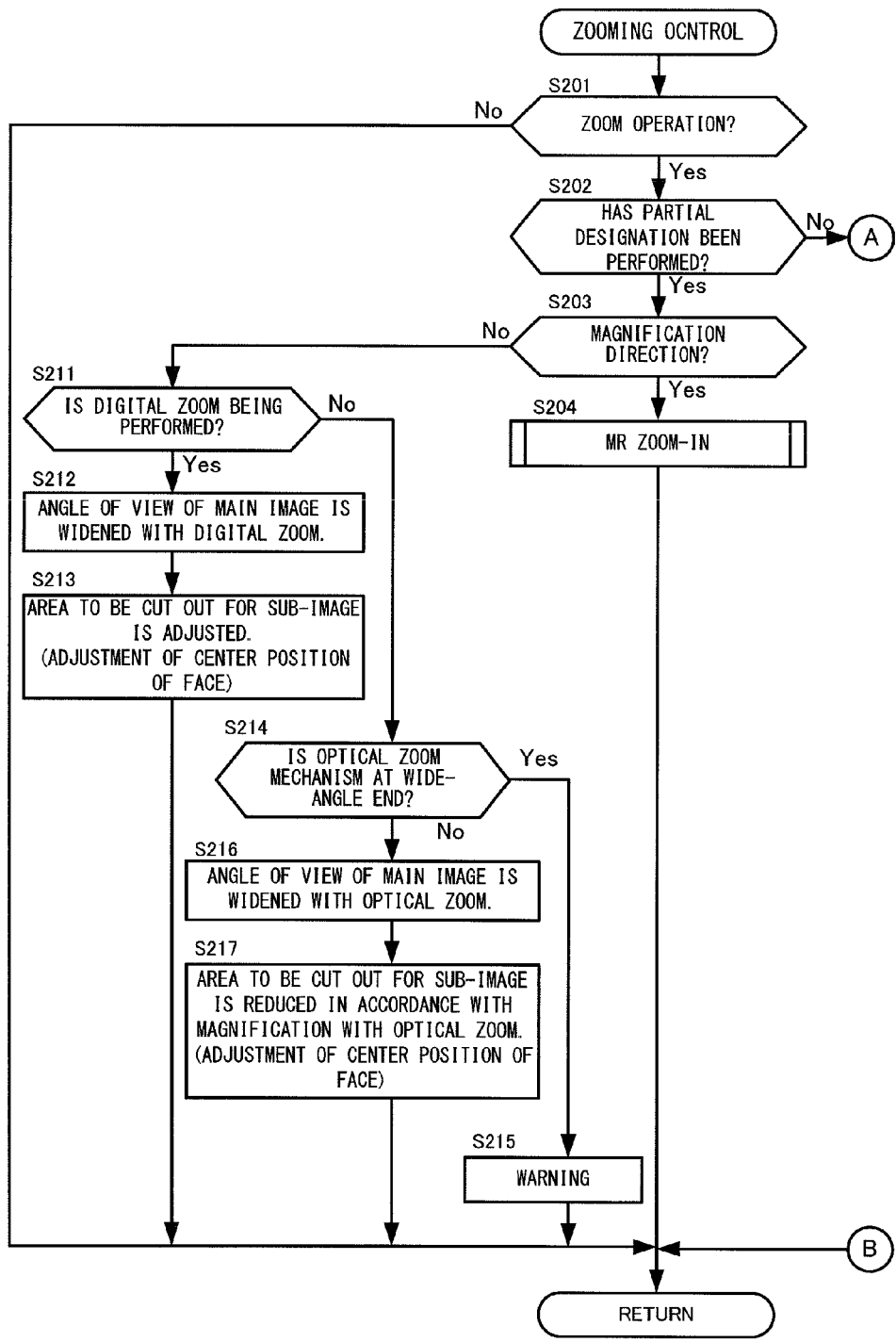
FIGS. 6A and 6B are flowcharts showing an example of zooming control of the digital camera according to the aspect of the embodiment.
Figure 6B:
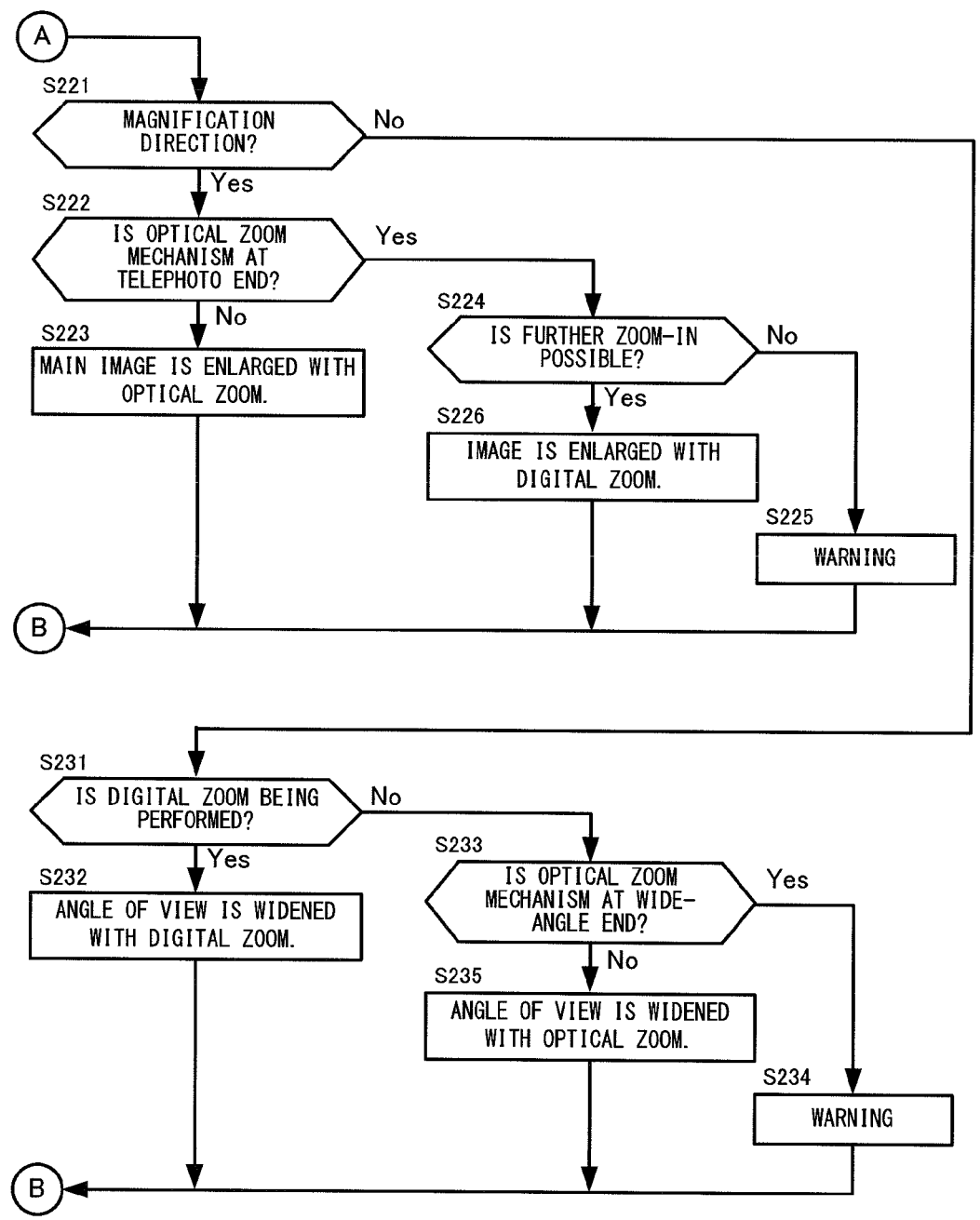

At step S114, the signal processing control unit 1 performs the zoom control which is described with reference to FIGS. 6A and 6B. At step S115, the signal processing control unit 1 determines whether or not an instruction to capture the still image during the moving image capturing has been input. When the instruction to capture the still image during the moving image capturing has not been input, the process proceeds to step S117. On the other hand, when the release button 6b is pressed in order to input the instruction to capture the still image during the moving image capturing has been input, for example, the process proceeds to step S116. At step S116, the signal processing control unit 1 captures the still image. The signal processing control unit 1 records data of the still image obtained by still image capturing on the recording unit 4. At step S117, the signal processing control unit 1 determines whether or not an instruction to end capturing the moving image has been input. When it is determined that the instruction to end capturing the moving image has not been input, the process proceeds to step S121.

At step S121, the signal processing control unit 1 determines whether or not the partial designation has been performed. When the partial designation has not been performed, the process proceeds to step S123. On the other hand, when the partial designation has been performed, the process proceeds to step S122. At step S122, the signal processing control unit 1 displays the sub-image in a frame of on the display unit 8. The signal processing control unit 1 continues to record the moving image relating to the sub-image. At step S123, the signal processing control unit 1 determines whether or not the partial designation has been cancelled. When the partial designation has not been cancelled, the process returns to step S112. On the other hand, when the partial designation has been cancelled, the process proceeds to step S124. At step S124, the signal processing control unit 1 sets the angle of the moving image of the sub-image to be equal to the angle of the moving image of the main image. According to the embodiment, the moving images of the main image and the sub-image are always handled and so when the partial designation relating to the sub-image is cancelled, the angle of the moving image of the sub-image is set to be equal to that of the main image. After that, the process returns to step S112.

When it is determined at step S117 that the video recording button 6a has been pressed in order to input the instruction to end capturing the moving image, for example, the process proceeds to step S131. At step S131, the signal processing control unit 1 generates an image file from the first moving image and/or the second moving image to record on the recording unit 4. When both the first moving image and the second moving image exist, the image file generated from these two moving images is associated with each other. When the still image has been captured at step S116, the signal processing control unit 1 associates the first moving image and/or the second moving image with the still image relating to the main image and/or the sub-image and obtained at step S116 to record in the recording unit 4.

Figure 10B:
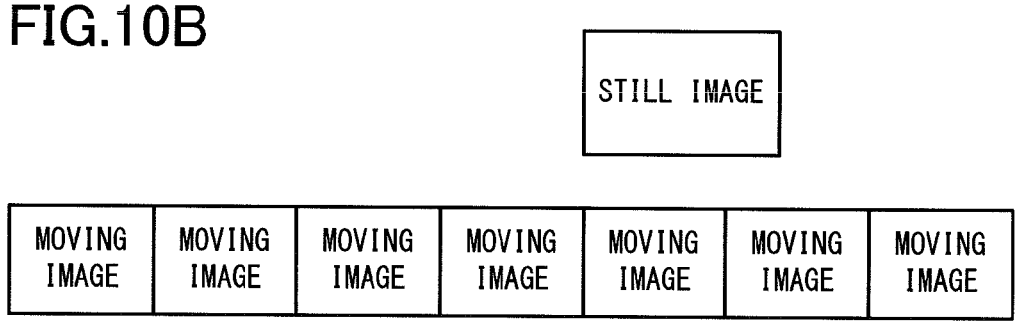
Figure 10C:
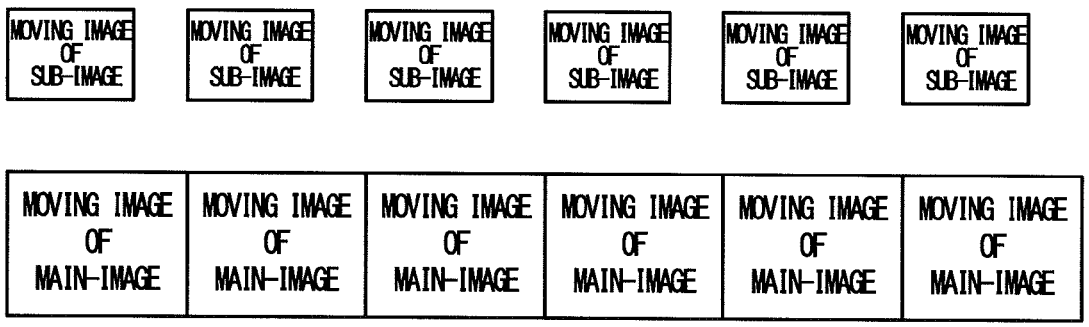

FIGS. 10B and 10C show the data recorded at step S131. As shown in FIG. 10B, when the still image has been captured at step S116, the image data recorded at step S131 includes the moving image after input of the instruction to start capturing the moving image until input of the instruction to end capturing the moving image and the still image when the instruction to capture the still image is input. The moving image may be either the moving image relating to the main image, the moving image relating to the sub-image, or both. The still image may be either the still image relating to the main image, the still image relating to the sub-image, or both. Such image data which includes the moving image and the still image is referred to as photo-in-movie.

As shown in FIG. 10C, when the angle of the moving Image relating to the main image differs from that of the moving image relating to the sub-image, the moving data relating to the main image and the moving data relating to the sub-image are recorded in the recording unit 4 in association with each other. In FIG. 10C, the moving image relating to the sub-image is shown smaller, which indicates that the moving image relating to the sub-image is a moving image which relates to a smaller image area than the moving image relating to the main image. Such image data which includes two moving images which are simultaneously obtained and have different angles of view is referred to as a multi frame.

Referring back to FIG. 5A, the shooting control will be further described. When it is determined at step S111 that the instruction to capture the moving image has not been input, the process proceeds to step S141. At steps S141, the signal processing control unit 1 determines whether or not an instruction to end the shooting mode has been input. When the instruction to end the shooting mode has not been input, the process returns to step S101. On the other hand, when the instruction to end the shooting mode has been input, the shooting control is terminated.

According to the embodiment, the angle of view of the sub-image is adjusted not to change when the MR zoom-in is performed. In other words, one of the optical zoom and the digital zoom is selected to ensure the angle of view of the sub-image. Additionally, the area to be cut out as the sub-image is adjusted so that the angle of view of the sub-image does not change when the optical zoom is performed. According to the embodiment, the user can concentrate on adjusting the main image in the zoom-in and the zoom-out during multi recording without considering the sub-image. According to the embodiment, the user can shoot an image with easy viewable multi recording shooting which the user intends.

According to the embodiment, the interested object is tracked by the tracking unit 1g and so the signal processing control unit 1 may control the zoom mechanism in accordance with movement of the interested object when it has moved. When the interested object is moving to a direction away from the image area of the main image, the signal processing control unit 1 makes the optical system 2 zoom out in accordance with the movement. Accordingly the interested object is tracked even if it has moved. The image capturing apparatus according to the embodiment is capable of setting an area of sub-image in an image area of the main image. A plurality of areas may be set in the image area of the main image in order to generate a plurality of the sub-images. As a result, a zooming range of the optical system is limited based on the set plurality of areas.

The order of the processes shown in the flowcharts is an example, and the order may be appropriately changed without departing from the spirit or scope of the general invention concept. In the above embodiment, a digital camera is employed as one example; however, the described technology can be applied to various image capturing apparatuses such as a smartphone having a camera function.

The invention may be achieved in a manner that a recording medium recording program codes of software which perform the functions disclosed in the above embodiments is supplied to an electronic apparatus, and a computer (such as a microcontroller, a microprocessor, a CPU, or a MPU) of the electronic apparatus reads and performs programs stored in the memory medium. That is, the program codes read from the memory medium perform the functions of the embodiment, and a storage medium which records the program codes configures the invention.

The functions disclosed in the embodiment can be performed not only by performing the program codes which are read by a computer. The program codes may use a part of processing functions which are included in an operating system (OS) installed in a computer of an electronic apparatus.

The computer which performs the program codes read from the memory medium is not limited to a single computer. A plurality of computers existing in an electronic apparatus may be connected and cooperate with each other to perform the program codes. Alternatively, an electronic apparatus and a peripheral apparatus may be connected. Computers existing in both apparatuses may be connected and made cooperate with each other to perform the program codes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an optical system including a zoom mechanism;
   an imaging unit configured to image an object image formed by the optical system and generate image data including a predetermined captured image area;
   a first image processing unit configured to generate first image data including a first image area included in the captured image area based on the image data;
   a second image processing unit configured to generate second image data including a second image area included in the captured image area based on the image data, the second image area not changing in size in relation to the object image regardless of a status of the optical system and a size of the first image area, and being smaller in area than the first image area;
   an optical system control unit which controls the zoom mechanism such that the first image area and the captured image area agree when the second image area is included in the first image area, and the second image area is included in the captured image area when the second image area is not included in the first image area; and
   a recording control unit configured to record the first image data and the second image data on a recording medium,
   wherein the first image processing unit sets the image data including the captured image area as the first image data when the second image area is included in the first image area, and extracts the image data corresponding to the first image area from the captured image area to generate the first image data when the second image area is not included in the first image area.

2. The imaging apparatus according to claim 1, further comprising:
   an area control unit configured to input a size of the first image area;
   a display unit configured to sequentially display the first image including the first image area specified by the area control unit; and
   a tracking unit configured to track an interested object included in the second image area and generate tracking information used to determine the second image area, wherein
   the optical system control unit controls the zoom mechanism based on the input from the area control unit,
   the first image processing unit generates data on the first image based on an input from the area control unit, and
   the second image processing unit generates data on the second image using the tracking information, regardless of the input from the area control unit.

3. A method for controlling an imaging apparatus having an optical system including a zoom mechanism, the method comprising:
   imaging an object image formed by the optical system and generating image data including a predetermined captured image area;
   generating, with a first image processing unit, first image data including a first image area included in the captured image area based on the image data;
   generating, with a second image processing unit, second image data including a second image area included in the captured image area based on the image data, the second image area not changing in size in relation to the object image regardless of a status of the optical system and a size of the first image area, and being smaller in area than the first image area;
   controlling the zoom mechanism such that the first image area and the captured image area agree when the second image area is included in the first image area, and the second image area is included in the captured image area when the second image area is not included in the first image area; and
   recording the first image data and the second image data on a recording medium,
   wherein the first image processing unit sets the image data including the captured image area as the first image data when the second image area is included in the first image area, and extracts the image data corresponding to the first image area from the captured image area to generate the first image data when the second image area is not included in the first image area.

4. The method of claim 3, further comprising:
   inputting a size of the first image area;
   displaying sequentially, the first image including the first image area;
   tracking an interested object included in the second image area;
   generating tracking information used to determine the second image area;
   controlling the zoom mechanism based on the size input;
   generating, with the first image processing unit, data on the first image based on the size input; and
   generating, by the second image processing unit, data on the second image using the tracking information, regardless of the size input.

5. A non-transitory computer-readable recording medium storing program instructions which, when executed by at least one processor, cause the at least one processor to perform a method for controlling an imaging apparatus having an optical system including a zoom mechanism, the method including:
   imaging an object image formed by the optical system and generating image data including a predetermined captured image area;
   generating, with a first image processing unit, first image data including a first image area included in the captured image area based on the image data;
   generating, with a second image processing unit, second image data including a second image area included in the captured image area based on the image data, the second image area not changing in size in relation to the object image regardless of a status of the optical system and a size of the first image area, and being smaller in area than the first image area;

controlling the zoom mechanism such that the first image area and the captured image area agree when the second image area is included in the first image area, and the second image area is included in the captured image area when the second image area is not included in the first image area; and recording the first image data and the second image data on a recording medium, wherein the first image processing unit sets the image data including the captured image area as the first image data when the second image area is included in the first image area, and extracts the image data corresponding to the first image area from the captured image area to generate the first image data when the second image area is not included in the first image area.

6. The non-transitory computer-readable recording medium of claim 5 wherein, the method further includes:

inputting a size of the first image area;

displaying sequentially, the first image including the first image area;

tracking an interested object included in the second image area;

generating tracking information used to determine the second image area;

controlling the zoom mechanism based on the size input;

generating, with the first image processing unit, data on the first image based on the size input; and generating, by the second image processing unit, data on the second image using the tracking information, regardless of the size input.

* * * * *